(12) United States Patent
Gangoli et al.

(10) Patent No.: US 9,873,926 B2
(45) Date of Patent: Jan. 23, 2018

(54) SYSTEM AND METHOD FOR CONTROL OF A COPPER MELTING FURNACE

(71) Applicant: Air Products and Chemicals, Inc., Allentown, PA (US)

(72) Inventors: Shailesh Pradeep Gangoli, Easton, PA (US); Reed Jacob Hendershot, Orefield, PA (US); Anup Vasant Sane, Allentown, PA (US); Michael J. Gallagher, Coopersburg, PA (US); Aleksandar Georgi Slavejkov, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 15/317,684

(22) PCT Filed: Oct. 9, 2015

(86) PCT No.: PCT/US2015/054876
§ 371 (c)(1),
(2) Date: Dec. 9, 2016

(87) PCT Pub. No.: WO2016/057889
PCT Pub. Date: Apr. 14, 2016

(65) Prior Publication Data
US 2017/0114430 A1   Apr. 27, 2017

Related U.S. Application Data

(60) Provisional application No. 62/062,565, filed on Oct. 10, 2014.

(51) Int. Cl.
*C22B 15/00* (2006.01)
*F27D 21/00* (2006.01)
(Continued)

(52) U.S. Cl.
CPC .......... *C22B 15/0095* (2013.01); *C22B 7/003* (2013.01); *C22B 9/16* (2013.01);
(Continued)

(58) Field of Classification Search
CPC   C22B 15/0095; C22B 15/006; F27D 21/0014
See application file for complete search history.

(56) References Cited

U.S. PATENT DOCUMENTS 3,990,890 A * 11/1976 Leroy ................. C22B 15/0041
75/643
2008/0002756 A1 * 1/2008 Worrell ................. G01J 5/0003
374/121

FOREIGN PATENT DOCUMENTS

CN   102560143   7/2012
CN   102933728   2/2013
(Continued)

OTHER PUBLICATIONS

Ogawa et al. JP 2012184483 A published Sep. 2012. Machine translation.*
(Continued)

*Primary Examiner* — George Wyszomierski
*Assistant Examiner* — Tima M McGuthry Banks
(74) *Attorney, Agent, or Firm* — Larry S. Zelson

(57) ABSTRACT

A method and system of controlling a melting process of copper in a copper melting furnace including measuring at least one furnace parameter, wherein the at least one furnace parameter includes one or both of a furnace temperature and a furnace exhaust oxygen concentration, calculating a first rate of change of the furnace parameter over a first time period, calculating a second rate of change of the furnace parameter over a second time period at least a portion of which occurs after the first time period, comparing the first rate of change with the second rate of change, and indicating
(Continued)

substantial completion of a process phase in the furnace when the second rate of change deviates by a predetermined threshold percentage from the first rate of change.

10 Claims, 5 Drawing Sheets

(51) Int. Cl.
    *C22B 7/00*     (2006.01)
    *C22B 9/16*     (2006.01)

(52) U.S. Cl.
    CPC ............ *C22B 15/00* (2013.01); *C22B 15/006* (2013.01); *C22B 15/0026* (2013.01); *F27D 21/0014* (2013.01); *Y02P 10/212* (2015.11)

(56) References Cited

FOREIGN PATENT DOCUMENTS

| | | |
|---|---|---|
| CN | 103131870 | 6/2013 |
| CN | 103645694 | 3/2014 |
| CN | 103667739 | 3/2014 |
| DE | 3318680 A1 * | 1/1984 ........... C22B 15/006 |
| JP | 2012184483 * | 9/2012 |
| WO | 9201074 A1 | 1/1992 |

OTHER PUBLICATIONS

Leval et al. DE 3318680 A1 published Jan. 1984. Machine translation.*
DE 3318680 A1 published Jan. 1984 (Delbrouck et al.), Full Written translation.*
Ogawa, Tsutomu et al., JP 2012-184483, Written translation. (Year: 2012).*
European International Search Report and Written Opinion of the International Searching Authority, dated Jan. 26, 2016, for PCT/US2015/054876.
Kapell Gerhard et al: "Contimelt: A New Continuous Melting and Refining Process for Copper," Journal of Metals. Springer-Verlag. Newyork, vol. 36. No. 1., Jan. 7, 2014 (Jan. 7, 2014). pp. 62-66. XP035303643. ISSN: 148-6608. DOI: 10.1007/BF03339917. [retrieved on Jan. 7, 2014].
Moskalyk R R et al: "Review of copper pyrometallurgical practice: today and tomorrow". Minerals Engineering. Pergamon Press • Oxford. GB. vol. 1 • 16. No. 10. Oct. 1, 2003 (Oct. 1, 2003). pp. 893-919. XP002743501. ISSN: 0892-6875. DOI: 10.1016/J.MINENG.2003.08.002 [retrieved on Sep. 17, 2003].

* cited by examiner

SYSTEM AND METHOD FOR CONTROL OF A COPPER MELTING FURNACE

CROSS-REFERENCE TO RELATED APPLICATIONS

This application claims the priority of U.S. Provisional Application No. 62/062,565, filed on Oct. 10, 2014, which is incorporated by reference herein in its entirety.

BACKGROUND

This application relates to detecting certain operating parameters in a copper melting furnace and using those detected parameters to improve control during one or both of the oxidation phase and the reduction phase.

SUMMARY

Methods are described herein for improving the efficiency of a copper melting furnace by enabling improved indication that a process phase, such as oxidation of impurities or reduction of excess oxygen in the melt, is nearing completion. Without the improved method described herein, a process phase may be operated for too long, causing an excess use of oxidizing or reducing gas and unnecessarily extending the process time, or for too short, resulting in poor product quality.

Aspect 1. A method of detecting the end of an oxidation phase in a copper melting furnace, comprising: measuring a temperature in the furnace and calculating a slope of the temperature change over time; and determining the end of the oxidation phase when the slope of the temperature change deflects downward to indicate depletion of readily oxidizable components in the copper melt.

Aspect 2. The method of Aspect 1, further comprising: measuring the oxygen concentration at an outlet of the furnace and calculating a slope of the oxygen concentration over time; and confirming the end of the oxidation phase when the slope of the oxygen concentration changes from relatively flat to an increasing oxygen concentration to indicate depletion of the readily oxidizable components in the copper melt.

Aspect 3. The method of Aspect 2, further comprising: measuring the temperature at an outlet of the furnace and calculating a slope of the furnace outlet temperature over time; and confirming the end of the oxidation phase when the slope of the outlet temperature change deflects downward to indicate depletion of readily oxidizable components in the copper melt.

Aspect 4. A method of detecting the end of a reduction phase in a copper melting furnace, comprising: measuring a temperature in the furnace and calculating a slope of the temperature change over time; and determining the end of the reduction phase when the slope of the temperature change deflects downward to indicate that the exothermic reduction reaction is being overtaken by convention cooling and endothermic fuel cracking.

Aspect 5. The method of Aspect 4, further comprising: measuring the flammables concentration at an outlet of the furnace and calculating a slope of the flammables concentration over time; and confirming the end of the reduction phase when the slope of the flammables concentration deflects upward to indicate a decrease in consumption of the inputted fuel.

Aspect 6. The method of Aspect 4, further comprising: measuring a variable at an outlet of the furnace indicative of flammables concentration and calculating a slope of the variable over time; and confirming the end of the reduction phase when the slope of the measured variable deflects upward to indicate a decrease in consumption of the inputted fuel.

Aspect 7. The method of Aspect 6, wherein the measured variable is a temperature in the furnace outlet, wherein an increase in the temperature in the furnace outlet is indicative of post-combustion of excess flammables exiting the furnace.

Aspect 8. The method of Aspect 5 or Aspect 6, further comprising: measuring the temperature at an outlet of the furnace and calculating a slope of the furnace outlet temperature over time; and confirming the end of the oxidation phase when the slope of the outlet temperature change deflects downward to indicate a decrease in the exothermic reduction reaction.

Aspect 9. A method of detecting the end of an oxidation phase in a copper melting furnace, comprising: measuring the oxygen concentration at an outlet of the furnace and calculating a slope of the oxygen concentration over time; and confirming the end of the oxidation phase when the slope of the oxygen concentration changes from relatively flat to an increasing oxygen concentration to indicate depletion of the readily oxidizable components in the copper melt.

Aspect 10. A method of controlling a melting process of copper in a copper melting furnace, comprising: measuring at least one furnace parameter, wherein the at least one furnace parameter includes one or both of a furnace temperature and a furnace exhaust oxygen concentration; calculating a first rate of change of the furnace parameter over a first time period; calculating a second rate of change of the furnace parameter over a second time period at least a portion of which occurs after the first time period; comparing the first rate of change with the second rate of change; and indicating substantial completion of a process phase in the furnace when the second rate of change deviates by a predetermined threshold percentage from the first rate of change.

Aspect 11. The method of Aspect 10, wherein the process phase is an oxidation phase; wherein the at least one furnace parameter is the furnace temperature; and wherein the substantial completion of the oxidation phase is determined when the second rate of change is less positive than the first rate of change to indicate depletion of readily oxidizable components in the copper.

Aspect 12. The method of Aspect 10, wherein the process phase is an oxidation phase; wherein the at least one furnace parameter is the furnace exhaust oxygen concentration; and wherein the substantial completion of the oxidation phase is determined when the second rate of change is more positive than the first rate of change to indicate depletion of readily oxidizable components in the copper.

Aspect 13. The method of Aspect 10, wherein the process phase is an oxidation phase; wherein the at least one process parameter is both of the furnace temperature and the furnace exhaust oxygen concentration; and wherein the substantial completion of the oxidation phase is determined when the second rate of change is less positive than the first rate of change for the furnace temperature and when the second rate of change is more positive than the first rate of change for the furnace exhaust oxygen concentration, to indicate depletion of readily oxidizable components in the copper.

Aspect 14. The method of any of Aspects 10 to 13, wherein the furnace parameter further includes a furnace exhaust temperature, the method further comprising: when the substantial completion of the oxidation phase has been determined, confirming the substantial completion of the oxidation phase when the second rate of change is less positive than the first rate of change for the furnace exhaust temperature.

Aspect 15. The method of any of Aspects 10 to 14, wherein the furnace temperature measured by an optical pyrometer directed at a metal bath in the furnace.

Aspect 16. The method of Aspect 10, wherein the process phase is a reduction phase; wherein the at least one process parameter is the furnace temperature; and wherein the substantial completion of the reduction phase is determined when the second rate of change is more positive than the first rate of change.

Aspect 17. The method of Aspect 16, wherein the furnace parameter further includes a furnace exhaust flammables concentration, the method further comprising: when the substantial completion of the reduction phase is determined, confirming the substantial completion of the reduction phase when the second rate of change is more positive than the first rate of change for the furnace exhaust flammables concentration, to indicate a decrease in consumption of the inputted fuel.

Aspect 18. The method of Aspect 16, wherein the furnace parameter further includes a furnace exhaust infrared intensity, the method further comprising: when the substantial completion of the reduction phase is determined, confirming the substantial completion of the reduction phase when the second rate of change is more positive than the first rate of change for the furnace exhaust infrared intensity, to indicate a decrease in consumption of the inputted fuel.

Aspect 19. The method of Aspect 16, wherein the furnace parameter further includes a furnace exhaust temperature, the method further comprising: when the substantial completion of the reduction phase is determined, confirming the substantial completion of the reduction phase when the second rate of change is more positive than the first rate of change for the furnace exhaust temperature, to indicate post-combustion of excess flammables exiting the furnace.

Aspect 20. The method of Aspect 16, wherein the furnace parameter further includes a furnace exhaust temperature, the method further comprising: when the substantial completion of the reduction phase is determined, confirming the substantial completion of the reduction phase when the second rate of change is less positive than the first rate of change for the furnace exhaust temperature, to indicate a decrease in the exothermic reduction reaction.

Aspect 21. The method of any of one of Aspects 16 to 20, wherein the furnace temperature measured by an optical pyrometer directed at a metal bath in the furnace.

Aspect 22. The method of Aspect 16, wherein the furnace temperature is measured by an optical pyrometer and wherein the at least one process parameter further includes a molten bath temperature, the method further comprising: when the substantial completion of the reduction phase is determined, confirming the substantial completion of the reduction phase when the second rate of change is less positive than the first rate of change for the molten bath temperature, to indicate that the exothermic reduction reaction is being overtaken by convention cooling and endothermic fuel cracking.

Aspect 23. The method of Aspect 10, wherein the process is a reduction phase; wherein the at least one process parameter is the furnace temperature, and wherein the furnace temperature is a molten bath temperature; wherein the substantial completion of the reduction phase is determined when the second rate of change is less positive than the first rate of change for the molten bath temperature, to indicate that the exothermic reduction reaction is being overtaken by convention cooling and endothermic fuel cracking.

Aspect 24. A system for controlling a melting process of copper in a copper melting furnace, comprising: at least one sensor configured to measure furnace parameter, wherein the at least one furnace parameter includes one or both of a furnace temperature and a furnace exhaust oxygen concentration; a process programmed to calculate a first rate of change of the furnace parameter over a first time period and a second rate of change of the furnace parameter over a second time period at least a portion of which occurs after the first time period, to compare the first rate of change with the second rate of change, and to determine the substantial completion of a process phase in the furnace when the second rate of change deviates by a predetermined threshold percentage from the first rate of change.

DETAILED DESCRIPTION

Methods and systems are described herein for monitoring and controlling operation of a copper melting furnace during one or both of an oxidation process and a reduction process.

Figure 2:
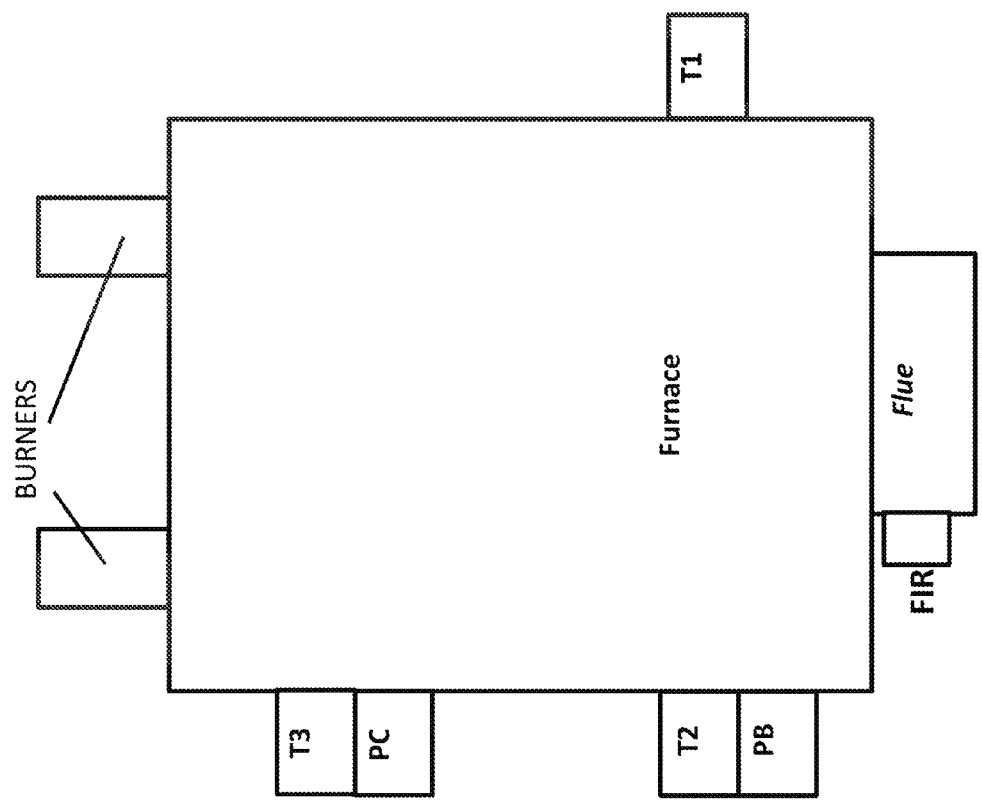
FIG. 2 is a top view schematic of an exemplary Copper scrap melting furnace showing the location of burners, a flue, a roof charge door, three exposed temperature sensors (T1, T2, T3), two optical pyrometers (PB, PC), and an exhaust gas infrared intensity sensor (FIR).

As shown in FIG. 2, sensors are installed in the furnace to measure various furnace parameters, which may include one or more of furnace gas temperature, metal bath surface temperature, furnace exhaust temperature, furnace exhaust infrared intensity, and furnace exhaust oxygen concentration. Such sensors may be located in any appropriate location in the furnace or the flue gas duct. With regard to temperature, optical pyrometers may be used to provide an indication of temperature of various surfaces in the furnace, including the metal bath and the furnace walls, as well as the temperature of any optically opaque substances within the furnace environment and combustion gases such as soot particles resulting from fuel-rich combustion. The optical pyrometers may be configured to detect emissions in one or more wavelength ranges, for example, from 0.9 to 1.1 micrometers, from 1.5 to 1.7 micrometers, from 2.0 to 2.4 micrometers, from 3.8 to 4.0 micrometers, or combinations thereof, noting that a pyrometer need not be able to detect all of the wavelengths in any particular range. Alternative or in addition, open thermocouples may be exposed to the furnace environment or slightly recessed within a furnace wall or roof but open to the furnace environment, as well as thermocouples positioned to as to measure or approximately measure a molten bath temperature.

Oxidation Process.

An oxidation process (or refining process in a secondary copper furnace is generally conducted after the melting process is complete. The oxidation of impurities, including other metals such as lead (Pb), tin (Sn), and aluminum (Al), makes the oxidation process exothermic in nature, thus increasing the temperature of the molten metal bath. This increase in temperature may be detected not only by an increase in the temperature of the molten bath, but also an increase in the furnace environment as detected by an open thermocouple or an optical pyrometer. However, competing with the exothermic oxidation there is typically a convective cooling process occurring concurrently as a result of relatively large volumes of air being injected into the molten metal bath, which tends to decrease the molten bath temperature.

Figure 1:
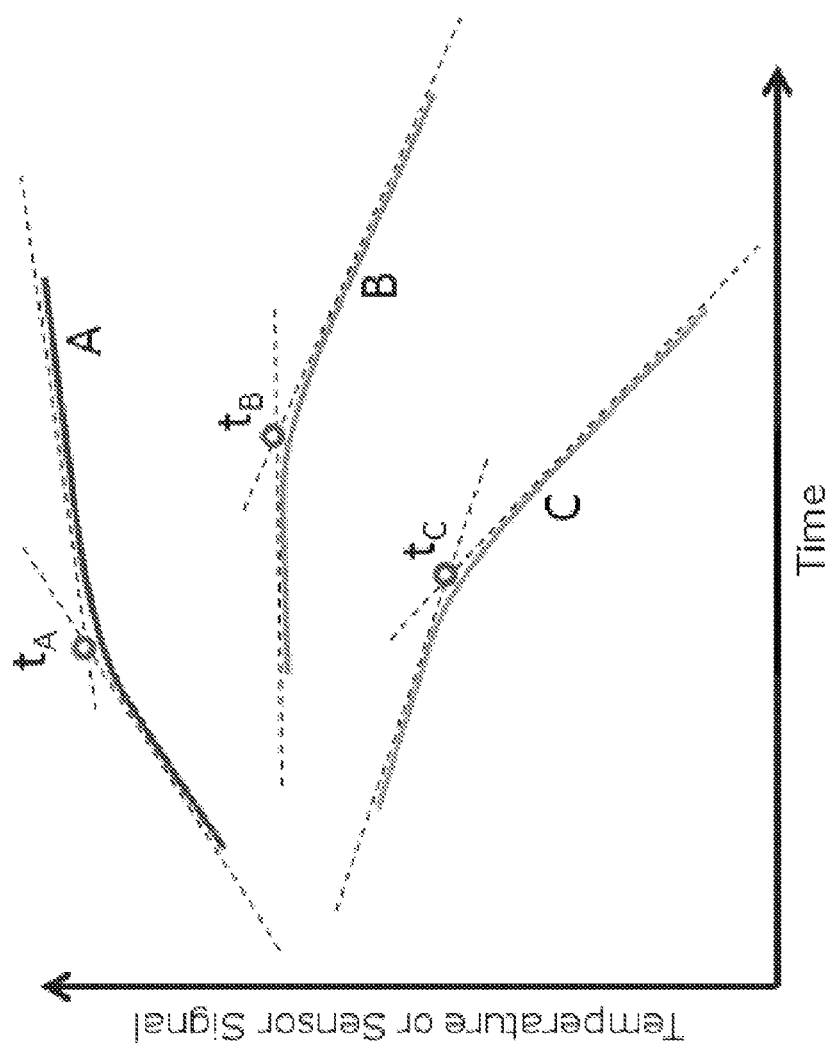
FIG. 1 is a graph showing examples of temperature sensor measurements of the molten metal bath as a function of time during the oxidation process.

Depending on the relative contribution of the two competing processes (heating due to exothermic oxidation of impurities and convective cooling due to air injection), the temperature of the metal bath will increase if the exothermic reaction heating exceeds convective cooling (see first portion of curve A, FIG. 1), flatten if the exothermic reaction heating and convective cooling offset each other or are basically in balance (see first portion of curve B, FIG. 1), or decrease if convective cooling exceeds exothermic reaction heating (see first portion of curve C, FIG. 1).

When the more readily oxidizing impurities begin to deplete in concentration and oxidation rate (and hence the exothermic reaction) decreases, it is possible to detect a change in slope of molten metal bath temperature with time. Detecting when this slope changes (shown as $t_A$, $t_B$, and $t_C$ in the curves of FIG. 1) can be used as an indirect indicator of progress of the oxidation process, including whether the oxidation process is slowing down or nearing completion. The same information may also be gleaned from other furnace parameters, either separately or in combination with the molten bath temperature, such as furnace environment temperature, furnace exhaust temperature, exhaust oxygen concentration, and exhaust infrared emission intensity. In other words, the rate of change of a furnace parameter may be continually or periodically calculated over successive periods of time (which may overlap or may be distinct), and the rate of change over one time period compared with the rate of change of the preceding time period, such that a difference between those rates of change that exceeds a predetermined threshold may be used to determine that the oxidation process is at or near completion. The accuracy of the determination will depend on locations of the measured temperatures (e.g., whether the temperature is measured at molten bath surface, submerged in the molten bath, in the furnace environment, or optically viewing the molten bath surface), as well as the averaging strategies employed to determine the rate of change of temperature or other sensor signals.

To enhance the accuracy of the determination that the oxidation phase has completed, a furnace temperature and an exhaust oxygen concentration may be used in combination. The furnace temperature is a temperature corresponding to any portion of the furnace, which may include, without limitation, a temperature measured by a thermocouple in a wall or roof of the furnace, or a temperature measured by an optical pyrometer or other non-contact temperature sensor of any surface in the furnace such as the charge or a wall. The oxygen concentration in the flue is typically stable when the rate of air injection and oxidation are constant (i.e., during oxidation of impurities). However, as the impurities get depleted (oxidized), the oxygen concentration in the flue increases, as less and less oxygen is being used for oxidation, while the rate of input of air into the furnace remains constant. Thus, a deviation in the rate of change of exhaust oxygen concentration can be used as either a primary or secondary indicator to detect substantial completion of the oxidation phase of the molten copper bath.

As used herein, the "end" or the "substantial completion" of a process phase, whether the oxidation phase or the reduction phase, means that the rate of reaction occurring in that phase begins to decrease to a degree that can be measured. For example, the substantial completion of the oxidation phase means that the process of oxidation has achieved removal of impurities by at least about 75%, preferably at least about 80%, and more preferably at least about 90%, and the substantial completion of the reduction phase means that the process of reduction has achieved removal of oxygen in the charge by at least about 75%, preferably at least about 80%, and more preferably at least about 90%.

It is preferable to use a combination of molten metal bath temperature and exhaust oxygen concentration to detect the end of the oxidation process to improve accuracy in detecting an end of the oxidation phase and to minimize false positives that might occur from relying on bath temperature alone.

In addition, the exhaust (flue) gas temperature may be used as tertiary guidance to further validate or confirm a determination, based on furnace temperature or a combination of furnace temperature and exhaust oxygen concentration, that the oxidation process is complete.

Figure 3:
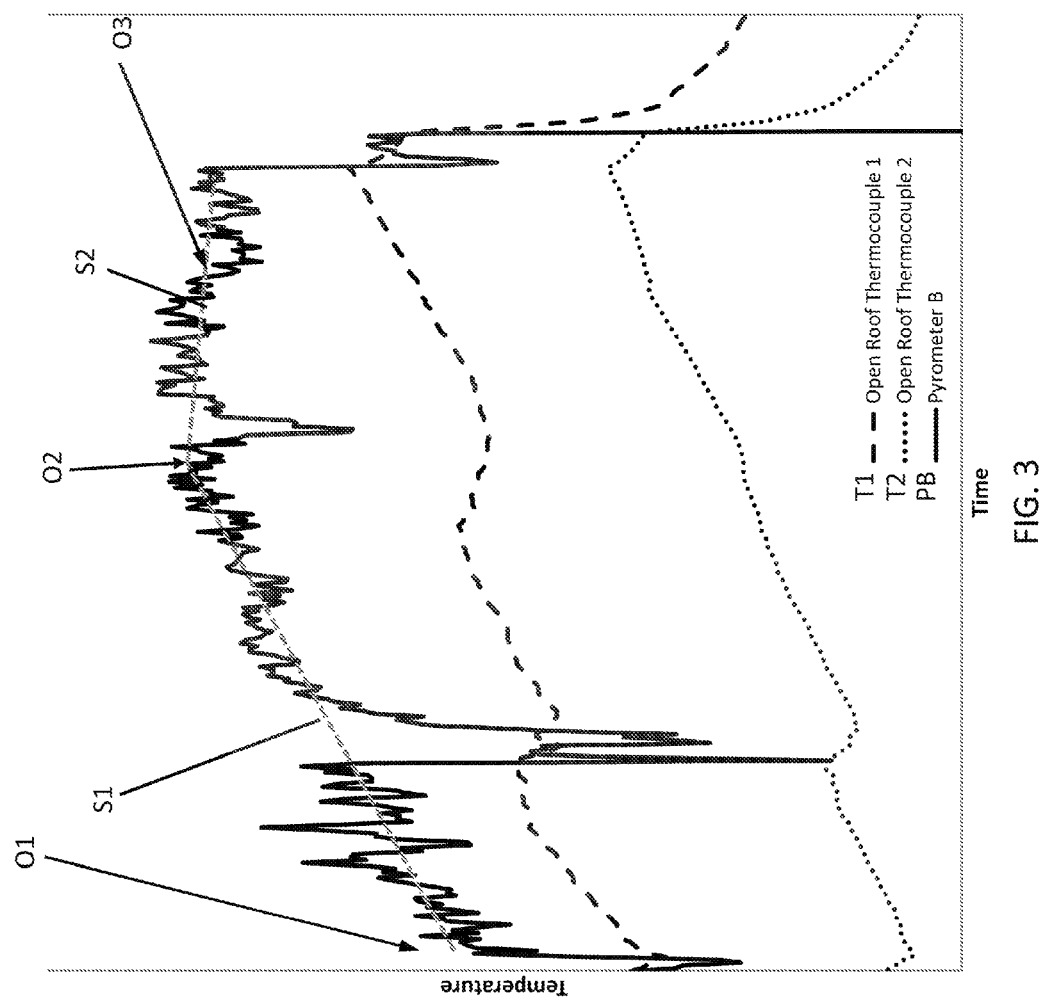
FIG. 3 is a graphical comparison of temperature measurements taken by one optical pyrometer (PB) and two exposed thermocouples (T1, T2) positioned in the roof in different locations in the furnace, as shown in FIG. 2, during a copper oxidation process.
Figure 4:
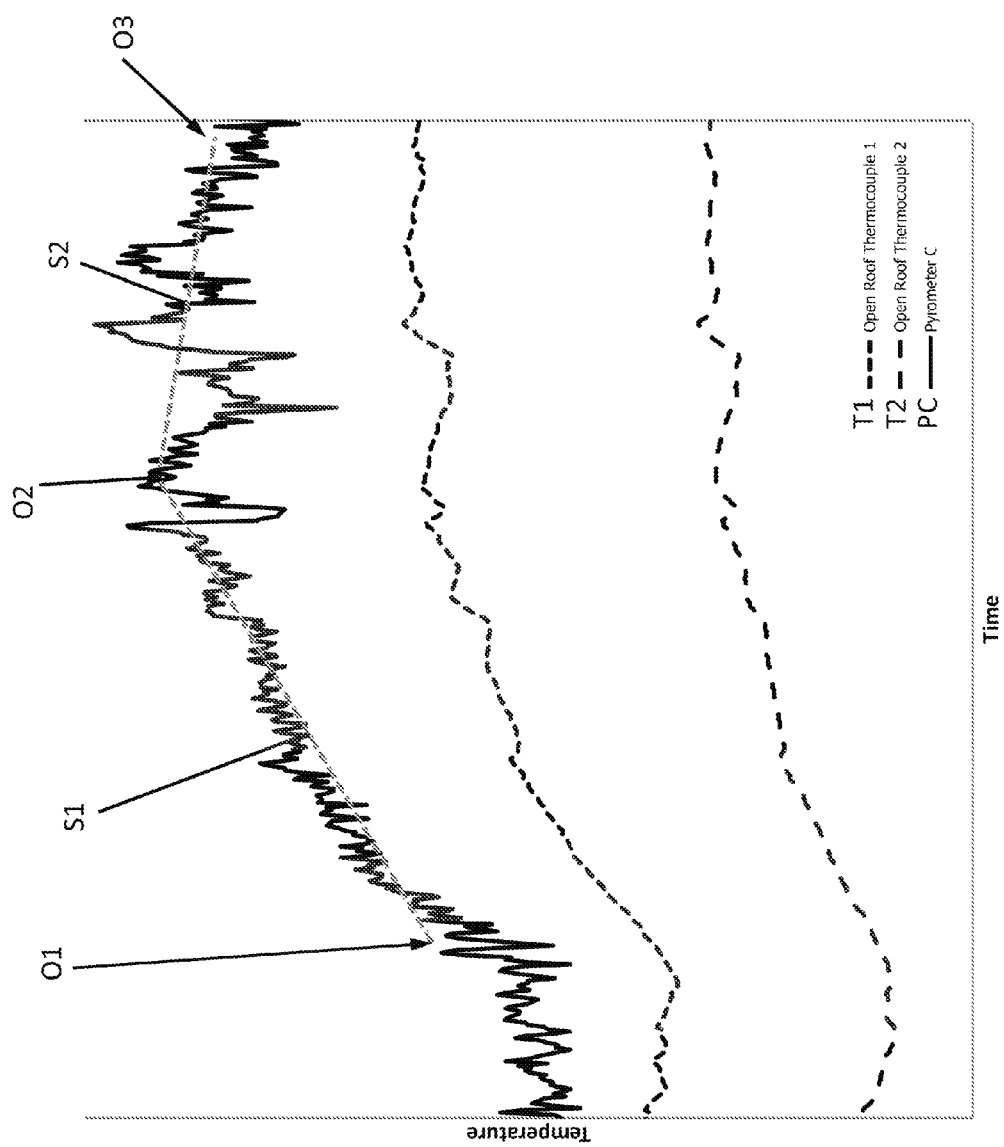
FIG. 4 is a graphical comparison of temperature measurements taken by one optical pyrometer (PC) and two exposed thermocouples (T1, T2) positioned in the roof in different locations in the furnace, as shown in FIG. 2, during a copper oxidation process.

As shown in FIG. 3, the temperature measured by the optical pyrometer PB shows a distinct change in slope indicative of the end of the oxidation phase. As marked, point O1 indicates the start of the oxidation process (commence injection of air into the molten metal bath) and point O3 indicates the end of the oxidation process (cease injection of air into the molten metal bath). Notably, the slope or rate of measured temperature change goes from positive (slope S1) to nearly flat or slightly negative (slope S2). The change of slope can be generally identified as point O2, wherein the temperature measurement of the pyrometer PB begins to detect that the impurities are being depleted or fully oxidized. This corresponds to the expected decrease in the exothermic oxidation reaction as impurities in the molten bath are depleted. Notably, while the optical pyrometer PB detects this change in temperature slope, the open thermocouples T1 and T2 in the roof are not sufficiently responsive to be useful for this purpose. FIG. 4 shows a very similar result comparing the optical pyrometer PC with the two open thermocouples T1 and T2.

Reduction Process.

The reduction process, which follows the oxidation process, involves the injection of a reducing agent, such as a fuel (e.g., natural gas or hydrogen) into the oxidized molten metal bath. The purpose of the reduction phase is to decrease oxygen remaining in the molten metal after completion of the oxidation process and removal of impurities by oxidation.

During reduction, the combination of fuel and oxidant in the molten metal bath is an exothermic process. Hence, the temperature of the metal bath typically increases through the reduction process. However, similar to the oxidation process, the slope of temperature typically decreases as the exothermic process slows down and is overtaken by convection cooling and energy spent on cracking of fuel. This change in slope of temperature can be used to detect the end of the reduction process.

Furthermore, as the reduction process comes to an end, meaning that oxides within the metal are neutralized or reduced, the intensity of flammables in the exhaust or flue gas duct may increase as a result of uncombusted or fuel fragments exiting the furnace. An sensor, for example to detect infrared (IR) and/or ultraviolet (UV), may be installed in the flue gas duct to detect this change in intensity of flammables in the furnace exhaust. Alternatively, a sensor may be installed in the flue gas duct to detect post-combustion of excess flammables leaving the furnace and entering the flue. In addition, a temperature detection sensor may be installed at the same location or further downstream in the flue gas duct to detect increased temperatures due to post-combustion of the exhaust, which may be used in combination with one or more other measured parameters to further reduce uncertainty in determining the end of the reduction process.

The rate of change of one or more of these furnace parameters may be continually or periodically calculated over successive periods of time (which may overlap or may be distinct), and the rate of change over one time period compared with the rate of change of the preceding time period, such that a difference between those rates of change that exceeds a predetermined threshold may be used to determine that the reduction process is at or near completion.

It is preferable to use a combination of molten metal bath temperature change and intensification of flammables in the flue duct to improve accuracy in detecting the end of the reduction process and to minimize false positives that might occur from relying on bath temperature alone.

Figure 5:
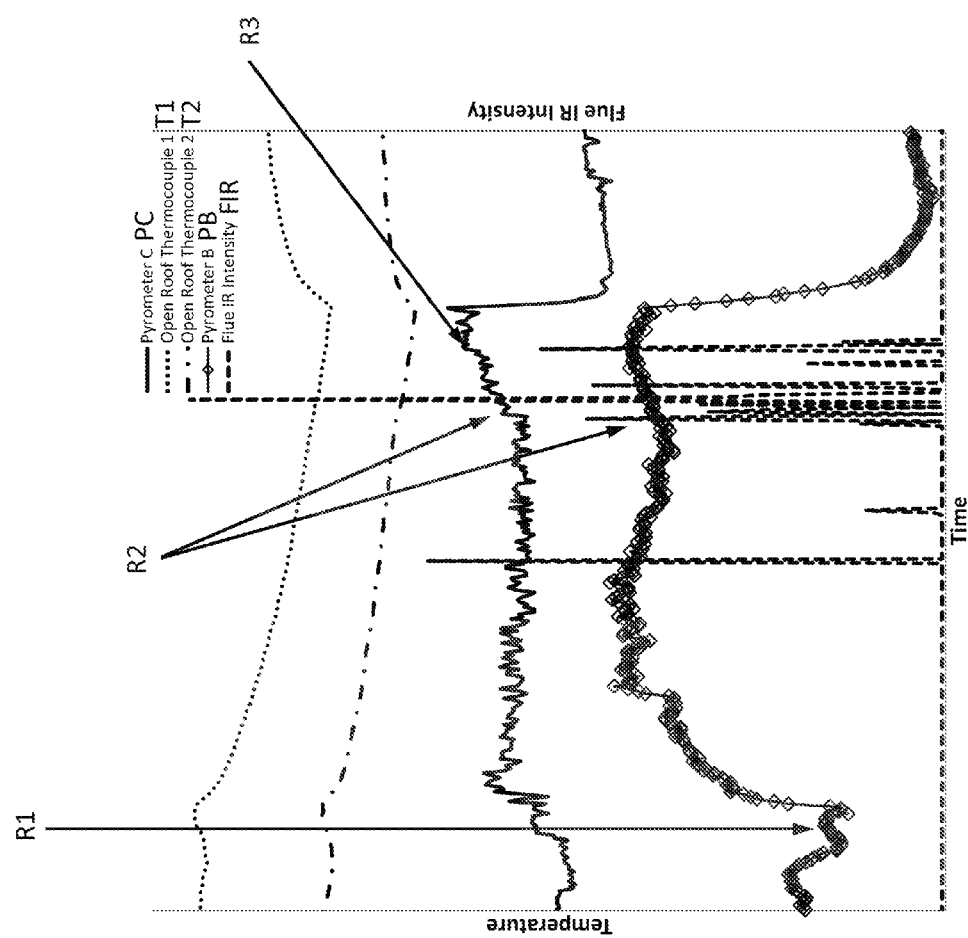
FIG. 5 is a graphical comparison of temperature measurements taken by two optical pyrometers (PB, PC) directed to different portions of the furnace, two exposed thermocouples (T1, T2) positioned in the roof in different locations in the furnace, and a flue infrared intensity sensor (FIR) as shown in FIG. 2, during a copper reduction process. Note that the signal from pyrometer PB is expanded to better show inflections in the slope or rate of change of the signal.

As shown in FIG. 5, the temperature measured by both of the optical pyrometers PB and PC, as well as an increase in signal activity from the exhaust-mounted IR sensor FIR, can be used to detect the approach of the end of the reduction process. As marked, point R1 indicates the start of the reduction process (commence injection of fuel into the molten bath) and point R3 indicates the end of injection of fuel into the molten bath.

The data shows that a combination of sensors can be used to optimize the copper reduction process by characterizing when the process is near completion and has been completed. Notably, during the reduction process, all of the temperature curves trend slightly downward (excluding the initial period after reduction begins), including both pyrometers PB and PC and both open thermocouples T1 and T2. However, toward the end of the reduction process, denoted generally as R2 on the graph, the slope of the measured temperatures from the pyrometers PB and PC become more positive (less negative) in slope, and begin to trend upward. Without being bound by theory, this is believed to most likely be due to a rich, sooty flame burning above the melt from excess fuel emerging from the bath, which thereby causes a local increase in the surface temperature. The flue infrared sensor (FIR) simultaneously triggers, indicating that the excess fuel is burning in the flue area.

Signal Filtering:

During both oxidation or reduction processes, if non-contact detection techniques are employed, it is possible to get interference from disturbances in the molten metal bath owing to the turnover of metal with high velocity oxidizing or reducing gases. Some smart filtering techniques (optical or computational) maybe employed to remove the noise from disturbances. Also, it has been found that instantaneous slopes or rate changes of the various process parameters may be misleading, such that all slopes or rate changes discussed herein are taken using some sort of time averaging, such as measuring the rate change over a continuously moving or rolling window or period of time.

The present invention is not to be limited in scope by the specific aspects or embodiments disclosed in the examples which are intended as illustrations of a few aspects of the invention and any embodiments that are functionally equivalent are within the scope of this invention. Various modifications of the invention in addition to those shown and described herein will become apparent to those skilled in the art and are intended to fall within the scope of the appended claims.

The invention claimed is:

1. A method of controlling a melting process of copper in a copper melting furnace, comprising:

introducing a flow of an oxidizing agent into a furnace to begin an oxidation phase;

measuring at least one furnace parameter, wherein the at least one furnace parameter comprises both of a furnace temperature and a furnace exhaust oxygen concentration;

calculating a first rate of change of the furnace parameter over a first time period;

calculating a second rate of change of the furnace parameter over a second time period at least a portion of which occurs after the first time period;

comparing the first rate of change with the second rate of change;

indicating substantial completion of the oxidation phase when the second rate of change deviates by a predetermined threshold percentage from the first rate of change;

halting the flow of the oxidizing agent into the furnace when substantial completion is indicated;

introducing a flow of a reducing agent into the furnace to begin a reduction phase;

calculating a third rate of change of the furnace parameter over a third time period;

calculating a fourth rate of change of the furnace parameter over a fourth time period;

comparing the third rate of change with the fourth rate of change; and indicating substantial completion of the reduction phase when the fourth rate of change deviates by a predetermined threshold percentage from the third rate of change; and halting the flow of the reducing agent into the furnace when substantial completion is indicated, wherein the substantial completion of the oxidation phase is determined when the second rate of change is less positive than the first rate of change for the furnace temperature and when the second rate of change is more positive than the first rate of change for the furnace exhaust oxygen concentration, to indicate depletion of readily oxidizable components in the copper.

2. The method of claim 1, wherein the at least one furnace parameter further includes a furnace exhaust temperature, the method further comprising:

when the substantial completion of the oxidation phase has been determined, confirming the substantial completion of the oxidation phase when the second rate of change is less positive than the first rate of change for the furnace exhaust temperature.

3. The method of claim 1, wherein the furnace temperature is measured by an optical pyrometer directed at a metal bath in the furnace.

4. The method of claim 3, wherein the at least one process parameter further includes a molten bath temperature, the method further comprising:
when the substantial completion of the reduction phase is determined, confirming the substantial completion of the reduction phase when the fourth rate of change is less positive than the third rate of change for the molten bath temperature, to indicate that the exothermic reduction reaction is being overtaken by convention cooling and endothermic fuel cracking.

5. The method of claim 1,
wherein the substantial completion of the reduction phase is determined when the fourth rate of change is more positive than the third rate of change.

6. The method of claim 1,
wherein the furnace temperature is a molten bath temperature;
wherein the substantial completion of the reduction phase is determined when the fourth rate of change is less positive than the third rate of change for the molten bath temperature, to indicate that the exothermic reduction reaction is being overtaken by convention cooling and endothermic fuel cracking.

7. A method of controlling a melting process of copper in a copper melting furnace, comprising:
introducing a flow of an oxidizing agent into a furnace to begin an oxidation phase;
measuring at least one furnace parameter, wherein the at least one furnace parameter includes a furnace exhaust flammables concentration and one or both of a furnace temperature and a furnace exhaust oxygen concentration;
calculating a first rate of change of the furnace parameter over a first time period;
calculating a second rate of change of the furnace parameter over a second time period at least a portion of which occurs after the first time period;
comparing the first rate of change with the second rate of change;
indicating substantial completion of the oxidation phase when the second rate of change deviates by a predetermined threshold percentage from the first rate of change for the furnace temperature or the furnace exhaust oxygen concentration;
halting the flow of the oxidizing agent into the furnace when substantial completion is indicated;
introducing a flow of a reducing agent into the furnace to begin a reduction phase;
calculating a third rate of change of the furnace parameter over a third time period;
calculating a fourth rate of change of the furnace parameter over a fourth time period;
comparing the third rate of change with the fourth rate of change; and
indicating substantial completion of the reduction phase when the fourth rate of change deviates by a predetermined threshold percentage from the third rate of change for the furnace temperature or the furnace exhaust oxygen concentration; and
halting the flow of the reducing agent into the furnace when substantial completion is indicated,
wherein when the substantial completion of the reduction phase is determined, confirming the substantial completion of the reduction phase when the fourth rate of change is more positive than the third rate of change for the furnace exhaust flammables concentration, to indicate a decrease in consumption of the inputted fuel.

8. A method of controlling a melting process of copper in a copper melting furnace, comprising:
introducing a flow of an oxidizing agent into a furnace to begin an oxidation phase;
measuring at least one furnace parameter, wherein the at least one furnace parameter includes a furnace exhaust infrared intensity and one or both of a furnace temperature and a furnace exhaust oxygen concentration;
calculating a first rate of change of the furnace parameter over a first time period;
calculating a second rate of change of the furnace parameter over a second time period at least a portion of which occurs after the first time period;
comparing the first rate of change with the second rate of change;
indicating substantial completion of the oxidation phase when the second rate of change deviates by a predetermined threshold percentage from the first rate of change for the furnace temperature or the furnace exhaust oxygen concentration;
halting the flow of the oxidizing agent into the furnace when substantial completion is indicated;
introducing a flow of a reducing agent into the furnace to begin a reduction phase;
calculating a third rate of change of the furnace parameter over a third time period;
calculating a fourth rate of change of the furnace parameter over a fourth time period;
comparing the third rate of change with the fourth rate of change; and
indicating substantial completion of the reduction phase when the fourth rate of change deviates by a predetermined threshold percentage from the third rate of change for the furnace temperature or the furnace exhaust oxygen concentration; and
halting the flow of the reducing agent into the furnace when substantial completion is indicated,
wherein when the substantial completion of the reduction phase is determined, confirming the substantial completion of the reduction phase when the fourth rate of change is more positive than the third rate of change for the furnace exhaust infrared intensity, to indicate a decrease in consumption of the inputted fuel.

9. A method of controlling a melting process of copper in a copper melting furnace, comprising:
introducing a flow of an oxidizing agent into a furnace to begin an oxidation phase;
measuring at least one furnace parameter, wherein the at least one furnace parameter includes a furnace exhaust temperature and one or both of a furnace temperature and a furnace exhaust oxygen concentration;
calculating a first rate of change of the furnace parameter over a first time period;
calculating a second rate of change of the furnace parameter over a second time period at least a portion of which occurs after the first time period;
comparing the first rate of change with the second rate of change;

indicating substantial completion of the oxidation phase when the second rate of change deviates by a predetermined threshold percentage from the first rate of change for the furnace temperature or the furnace exhaust oxygen concentration;

halting the flow of the oxidizing agent into the furnace when substantial completion is indicated;

introducing a flow of a reducing agent into the furnace to begin a reduction phase;

calculating a third rate of change of the furnace parameter over a third time period;

calculating a fourth rate of change of the furnace parameter over a fourth time period;

comparing the third rate of change with the fourth rate of change; and indicating substantial completion of the reduction phase when the fourth rate of change deviates by a predetermined threshold percentage from the third rate of change for the furnace temperature or the furnace exhaust oxygen concentration; and halting the flow of the reducing agent into the furnace when substantial completion is indicated, wherein when the substantial completion of the reduction phase is determined, confirming the substantial completion of the reduction phase when the fourth rate of change is more positive than the third rate of change for the furnace exhaust temperature, to indicate post-combustion of excess flammables exiting the furnace.

10. A method of controlling a melting process of copper in a copper melting furnace, comprising:

introducing a flow of an oxidizing agent into a furnace to begin an oxidation phase;

measuring at least one furnace parameter, wherein the at least one furnace parameter includes a furnace exhaust temperature and one or both of a furnace temperature and a furnace exhaust oxygen concentration;

calculating a first rate of change of the furnace parameter over a first time period;

calculating a second rate of change of the furnace parameter over a second time period at least a portion of which occurs after the first time period;

comparing the first rate of change with the second rate of change;

indicating substantial completion of the oxidation phase when the second rate of change deviates by a predetermined threshold percentage from the first rate of change for the furnace temperature or the furnace exhaust oxygen concentration;

halting the flow of the oxidizing agent into the furnace when substantial completion is indicated;

introducing a flow of a reducing agent into the furnace to begin a reduction phase;

calculating a third rate of change of the furnace parameter over a third time period;

calculating a fourth rate of change of the furnace parameter over a fourth time period;

comparing the third rate of change with the fourth rate of change; and indicating substantial completion of the reduction phase when the fourth rate of change deviates by a predetermined threshold percentage from the third rate of change for the furnace temperature or the furnace exhaust oxygen concentration; and halting the flow of the reducing agent into the furnace when substantial completion is indicated, wherein when the substantial completion of the reduction phase is determined, confirming the substantial completion of the reduction phase when the fourth rate of change is less positive than the third rate of change for the furnace exhaust temperature, to indicate a decrease in the exothermic reduction reaction.

* * * * *